United States Patent
Shobert

[15] 3,658,128
[45] Apr. 25, 1972

[54] REINFORCED PLASTIC WELL SCREEN

[72] Inventor: Samuel M. Shobert, 17760 Dragon Trail, Mishawaka, Ind. 46544

[22] Filed: Feb. 9, 1970

[21] Appl. No.: 9,925

Related U.S. Application Data

[63] Continuation-in-part of Ser. No. 695,778, Jan. 4, 1968, abandoned.

[52] U.S. Cl. ............................................166/231, 210/497.1
[51] Int. Cl. ..........................................................E21b 43/08
[58] Field of Search............166/227, 231, 232, 233, 234; 210/497.1

[56] References Cited

UNITED STATES PATENTS

| 1,763,996 | 6/1930 | Willers | 166/231 X |
|---|---|---|---|
| 1,858,592 | 5/1932 | Johnson | 166/231 |
| 2,155,744 | 4/1939 | Westrum | 166/231 X |
| 2,160,790 | 5/1939 | Swanson | 166/231 |
| 2,341,783 | 2/1944 | Jens | 166/231 |
| 3,385,373 | 5/1968 | Brown | 166/232 |
| 3,398,837 | 8/1968 | Adams | 210/497.1 X |
| 3,200,952 | 8/1965 | Jardin | 210/497.1 X |

*Primary Examiner*—David H. Brown
*Attorney*—Hood, Gust, Irish & Lundy

[57] ABSTRACT

A well screen in the form of a self-supporting element of cylindrical shape having a plurality of openings therein is constructed of a plurality of bundles of glass filaments embedded in hardened resin, a first series of these bundles being in the form of a number of circles or turns axially spaced and a second series of bundles being in the form of bars which extend axially in circumferentially spaced relation, all of said bundles being spaced sufficiently far apart to provide openings therebetween.

4 Claims, 13 Drawing Figures

PATENTED APR 25 1972

Inventor
SAMUEL M. SHOBERT

Hood, *Gust, Irish & Lee*
Attorneys

3,658,128

REINFORCED PLASTIC WELL SCREEN

This is a continuation-in-part application of application, Ser. No. 695,778, now abandoned, filed Jan. 4, 1968.

BACKGROUND OF THE INVENTION

1. Field of the Invention

The present invention relates to a reinforced plastic well screen and more particularly to a well screen fabricated of resin reinforced with glass filaments which provides greater life and trouble-free operation.

2. Description of the Prior Art

Prior art well screens have conventionally been fabricated of metal which is attacked by the processes of electrolysis and corrosion. In water wells of the larger variety, such as those used for industrial and irrigating purposes, such well screens are usually quite large and consequently quite expensive. It is a costly process to repair wells because of screen damage and breakdown.

SUMMARY OF THE INVENTION

In accordance with the broader aspects of this invention, there is provided a reinforced plastic well screen of cylindrical shape having a multiplicity of openings therein. The openings are defined by circumferentially and longitudinally extending bundles of glass filaments which are embedded in heat-hardenable plastic, the quantity of plastic and filaments as well as the arrangements thereof serving to provide a required degree of flexural and torsional flexibility as well as strength.

OBJECTS OF THE INVENTION

It is therefore an object of this invention to provide a well screen fabricated of glass filaments embedded in a hardened plastic material.

It is another object of this invention to provide a reinforced plastic well screen having a long wear-life and functional characteristics which reduce the tendencies of clogging, corrosion, breakage and the like.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein.

DESCRIPTION OF THE PREFERRED EMBODIMENTS

Figure 1:
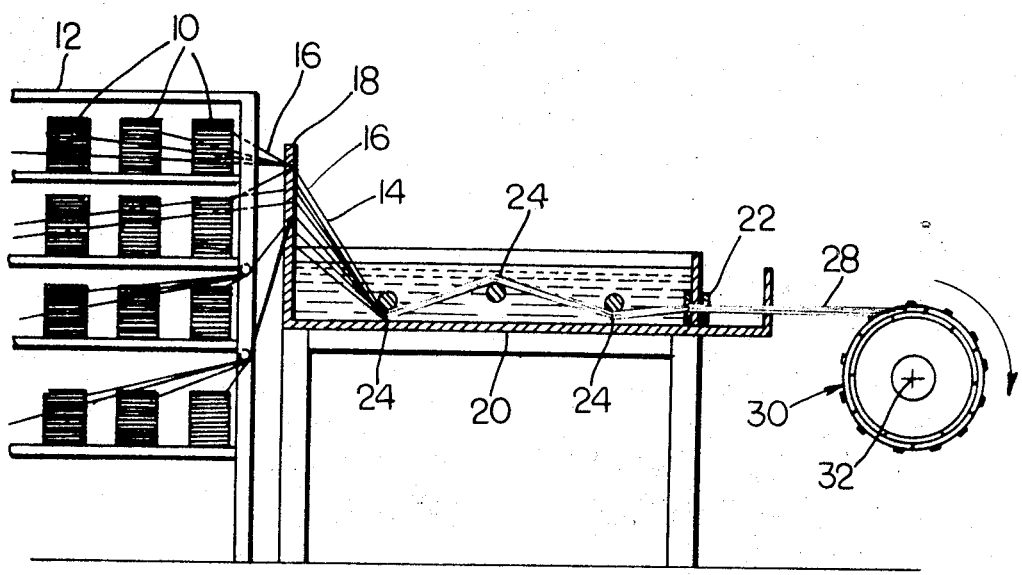
FIG. 1 is a longitudinal sectional illustration, partially in diagrammatic form, of apparatus used in connection with practicing this invention.

Referring to the drawings, and more particularly to FIG. 1, the reinforcement used in this invention is in the form of glass filaments or fibers of conventional physical and chemical characteristics, such fibers being currently used in many different reinforced plastic articles such as fishing rods, boats, automobile bodies and the like. In the manufacture of such fibers, it is conventional to produce glass monofilaments of substantial length by a centrifuging or spinning apparatus. In the usual case, the spinning apparatus is provided with a plurality of centrifuging apertures having platinum bushings, a monofilament being centrifuged from each of these bushings. Further, in the usual case, there are 204 apertures in a single spinning head such that the strand-like product which issues from the spinner is in the form of a thread or the like made up of 204 basic filaments of glass. This particular thread is called "an end", a single "end" having 204 basic filaments. Hereinafter, the term "single end" will be used to denote such a basically fabricated thread; however, it will be readily understood by those persons skilled in the art that the number of basic filaments in the "end" may be varied without departing from the scope of this invention.

Of importance with respect to this invention is the fact that when the individual monofilaments issue from the spinner, they are of considerable length. When there are a plurality of these filaments issuing from the spinner, they are compacted or assembled together in a relatively tiny "end" which is wound into what is called a "cake". This "cake" may be considered as resembling an ordinary spool of thread with the spool removed.

The "cake" thereupon serves as the package from which a user may dispense the "end". In any event, it is of importance in this invention to recognize that the "ends" or "threads" in the "cakes" are as close as possible to the raw product which emerges from the spinner and that in this "cake" form, the monofilaments are of maximum length.

It has also been found that when these "ends" are twisted or are assembled with the other "ends" and twisted or otherwise rubbed together, the attrition will break the monofilaments into shorter lengths. In finally finished products wherein these broken filaments serve as reinforcement, the strength of the finished product is much less than it otherwise would be if the filaments were not broken. It is therefore important in the present invention that the methods are techniques utilized produce a minimum of breakage in the filaments so as to provide maximum strength in the finished product.

Referring to FIG. 1, "cakes" of glass "ends" are identified by the numeral 10, there being a plurality of these "cakes" supported by a suitable creel 12. The "ends" are wound in a helix in these "cakes" and may be payed therefrom by merely being withdrawn. As shown in FIG. 1, a plurality of these "cakes" 10 have the threads 14 drawn therefrom and passed through companion apertures 16 in a flat guide plate 18, this plate 18 being mounted on the rear end of a suitable elongated vessel 20 having an apertured gathering die 22 in the distal end thereof. Transverse of the vessel or tank 20 are a series of fixedly mounted, smooth, horizontal steel rods 24 which are kept continuously submerged in liquid resin or plastic maintained at a level as indicated by reference numeral 26 in FIG. 1.

The apertures 16 in the distribution plate 18 are spaced apart both horizontally and vertically as shown. The threads 14 after being passed through the apertures 16 are guided under and over the respective transverse bars 24 as shown and are also passed through the aperture of gathering die 22. Just enough threads 14 are used such that the bundle of threads as indicated by numeral 28 which emerges from the die 22 is thoroughly impregnated with resin without any air pockets or voids being formed. If too much glass, or in other words too many threads, are passed through the die 22, the resulting bundle will be starved for resin, whereupon it will draw in air and thereby create voids or fractures in the finished product. This produces a weakness, which should be avoided. If this condition should develop, the total number of threads should be reduced until this condition disappears. If too few threads are used, an excess of resin will be entrained in the bundle, and this resin will drop therefrom. Thus, the ratio of thread to resin should be set to fall between these two extremes.

As is shown more clearly in FIG. 1, as the individual threads 14 enter the bath 26 of resin, they are not in contact with any other threads. Thus, these threads become thoroughly wetted with resin before they arrive at the first transverse guide bar 24. Upon arriving at this bar 24, the threads will be transversely spaced to a degree corresponding to the horizontal spacing of the apertures 16 in the distribution plate 18, these threads which are vertically aligned by reason of the vertical arrangement of the apertures 16 becoming bunched together. The important point to note is that before the individual threads 14 become bunched together or placed into contact with one another, they are first wetted with the resin 26. It will be appreciated that this resin may be of the conventional epoxy or polyester type which hardens upon curing. Curing by heating is conventional.

The threads 14 are passed under and over the bars 24 as shown prior to being collected by the die 22. Thus, the threads become thoroughly wetted by passing through the resin 26 prior to the time they are assembled into bundle 28. Preferably, the aperture in gathering die 22 is round, such that the shape of the bundle 28 as it emerges from the die is cylindrical.

By way of explaining the importance of the apparatus described thus far, if everything remained the same except the resin 26 were eliminated, this would mean that threads 14 would be assembled together into bundle 28 in dry condition. It has been found that the monofilaments in the threads by reason of attrition therebetween results in breakage thereof. However, it has been discovered that by wetting these monofilaments prior to the time of assembling the same together, the resin acts as a lubricant and thereby reduces breakage to a minimum. Thus the filamentary material contained in bundle 28 as it emerges from die 22 is of maximum length, hence strength.

An elongated, hollow, cylindrical mandrel 30 is mounted in a lathe or the like for rotation about its axis 32. This axis 32 preferably is horizontally arranged. Preferably, mandrel 30 is so mounted that it will be rigidly supported against movement as it is being rotated.

Figure 2:
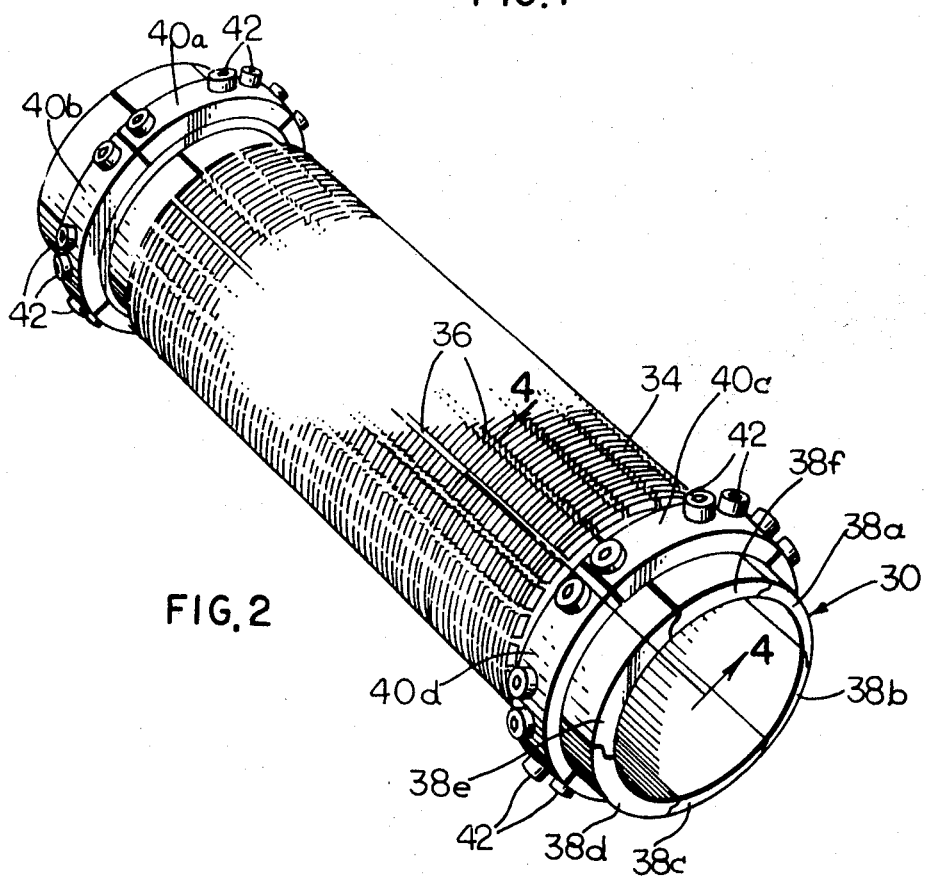
FIG. 2 is a perspective illustration of a mandrel constituting an embodiment of this invention.
Figure 3:
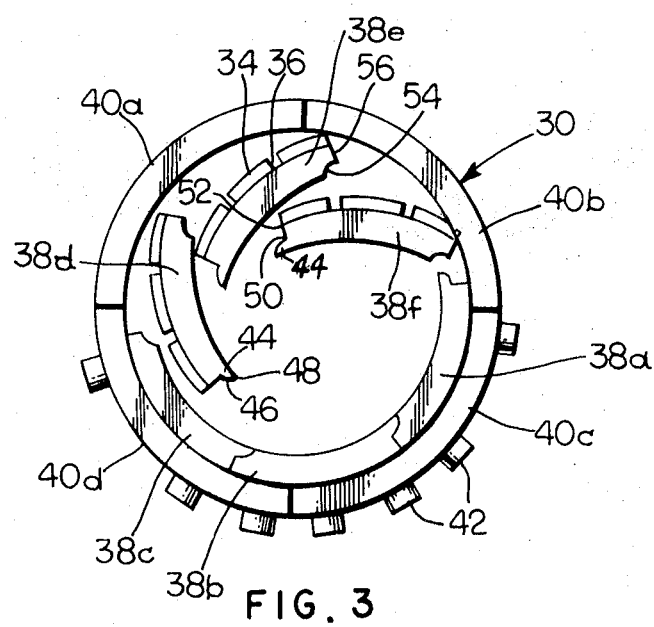
FIG. 3 is an end view of the mandrel of FIG. 2 showing certain of the segments composing the mandrel being in the process of being disassembled.

The mandrel 30 itself is best illustrated in FIGS. 2 and 3. In general, it is provided with two series of grooves, one series being helical and the other longitudinal. The helical grooves are indicated by the reference numeral 34, which, in the illustrated embodiment, may be regarded as a single helical groove extending from one end portion of the mandrel 30 to the other. The turns of the groove 34 are contiguous and correspond to screw threads on an ordinary bolt. As shown more clearly in FIG. 4, the shape of the groove 34 corresponds to a "V", the sides of the "V" in this case extending at an angle of about 30° with a radius of the mandrel. It will be noted that the adjacent turns of the groove 34 result in the forming of points.

The second series of grooves are those indicated by the numeral 36 which extend substantially parallel to the mandrel axis. These grooves 36 are equally spaced apart circumferentially as shown, the spacing between these grooves 34 corresponding to the dimension which spans about four or five of the helical turns. Other spacing may be used, as will appear from the following explanation.

The grooves 36 are rectangular in cross-section and are coextensive in depth with the helical grooves 34. Thus, all the helical grooves (turns) 34 are intersected as shown by the longitudinal grooves 36.

With respect to the cross-sectional shape of the longitudinal grooves 36, it is important that the radially inner width thereof be no less than the radially outer width. As a matter of fact, it is preferred that the radially inner width be slightly greater than that of the outer portion.

The mandrel 30 preferably is fabricated of metal. All of the grooves 34 and 36 should be polished to a smooth finish so as to facilitate removal of hardened resin parts therefrom.

The mandrel 30 is actually composed, as shown in FIGS. 2 and 3, of six part-cylindrical segments indicated by the numerals 38a, 38b, 38c, 38d, 38e and 38f as shown. All of these segments are constructed identically, so a description of one will suffice for all. They are provided with longitudinal edges which are straight and parallel to the axis of the mandrel 30, the edges of the various segments being in abutting engagement when they are assembled together in the cylindrical form shown in FIG. 2. The grooves 34 and 36 are terminated a short distance in from the opposite ends of the mandrel as shown in FIG. 2, the opposite end portions being smooth and cylindrical as shown. Secured to these end portions are a series of arcuate clamps or fastening members 40a, 40b, 40c, 40d, etc., which have inner surfaces conforming identically to the outer curvature of the mandrel end portions. These clamps 40a through 40d are rigidly and securely fastened to the mandrel end portions in overlapping relation to the abutted segment edges by means of a series of bolts 42 which are threaded into the segments 38a through 38f. Thus, each clamp 40a through 40d is securely bolted to at least two of the mandrel segments to thereby secure the latter firmly together. The clamps 40a through 40d, respectively, are arranged in a circle with the ends of adjacent clamps contiguous such that the clamp assembly resembles a solid ring.

The longitudinal edges of the individual segments 38a through 38f are uniquely shaped as shown more clearly in FIG. 3. The shapes of these edges are such that collapsing of the individual segments 38a through 38f radially inwardly is facilitated. Since the corresponding edges of all of these segments are identical, a description of the edge shape of one segment will suffice for all. Selecting the segment 38f which is shown as being partially collapsed in FIG. 3, the one edge, in cross-section, is formed with a "lip" 44 provided with a curvature 46 (see segment 38d) which extends from the distal portion 48 to the proximal portion 50. The distal portion 48 corresponds to a point, while the proximal portion 50 constitutes the widest portion of lip 44. The remainder of the edge is straight and coincides with a radius of the mandrel 30, this radial edge portion being indicated by numeral 52.

This particular edge just described mates precisely with the edge portion of the adjacent segment 38e which is shaped to be complementary. This edge of the segment 38e is provided with a curved recess indicated by numeral 54 which intimately fits the curvature of the lip 44 of the segment 38f. The remainder of the edge has a straight portion 56 which is formed along a radius of the mandrel and mates with the edge 52 of the segment 38f.

As shown in FIG. 3, these particular shapes and parts of the segment edges facilitate a swinging movement of the various segments radially inwardly until they can become disengaged from the adjacent segment and completely disassembled from the mandrel. The abutting edges may be described as having shapes which permit pivotal or hinging action between segments until the segments can be moved radially inwardly far enough to be completely separated from the adjacent segments. The process of disassembly is clearly illustrated in FIG. 3.

In order to disassemble these segments, it is necessary to remove the bolts 42. In the assembly operation, the individual segments are fitted together into the cylindrical shape shown in both FIGS. 2 and 3 and the clamps 40a through 40d and the bolts 42 are installed to secure the segments rigidly together into the cylindrical form of the mandrel 30.

Referring once again to FIG. 1, operation of the apparatus thus far described will be explained. Lengths of the bundle 28 are laid into the grooves 36 and there held in tension. The size of the bundle 28 is made to correspond substantially to that which will almost fill the grooves 36. If desired, the bundles installed in the grooves 36 may be extended slightly therebeyond so that they may be tied to the mandrel at the end portions of the latter by means of a circumscribing piece of string or twine.

The bundle 28, under tension, is thereupon started in the end of the helical groove 34 and the mandrel is thereupon rotated in the direction of the arrow in FIG. 1 so as to wrap the bundle into the groove 34 from one end to the other of the mandrel. The bundle windings will thereupon overlap and engage the longitudinal bundles in the grooves 36 after the helical groove 34 has been filled from one end to the other of the mandrel. Following this, the bundle 28 is cut and the free end on the mandrel is tied in place by means of a piece of string or the like wrapped around the mandrel. The resin is now cured by placing the mandrel with the wrapped assembly thereon in a heating oven or the like. After curing, the mandrel is disassembled as previously explained so as to permit removal of the fiberglass assembly therefrom as it substantially appears in FIG. 5.

The outer surface of the fiberglass cylinder removed from the mandrel is next ground to a smooth finish and also to a depth as will determine the size desired of the various openings 58 to be described in more detail hereinafter.

Referring more specifically to FIGS. 5 through 8, the precise construction of the finished well screen will be described. The bundles of resin impregnated glass filaments, tensioned upon being applied to the longitudinal grooves 36, will appear in the finished products as the longitudinally extending bars 60 which are spaced circumferentially apart equal distances. The tensioned bundle applied to the helical groove 34 will appear as the turns or bundles 62, which, in cross-section, are triangular as shown more clearly in FIG. 6. These turns 62 in cross-sectional shape correspond to the shape of the groove 34 in the mandrel 30. By spacing the turns of the helical groove 34 in the mandrel, and also by grinding some of the outer surface off the resin-glass assembly that is taken off the mandrel, openings 58 are formed which extend circumferentially and are elongated are formed. Inasmuch as the circumferential wraps 62 are triangular in shape with the broadest dimension radially outwardly, it is seen that as the outer surface of the resin-glass cylinder is ground, the openings 58 may be made larger. Thus, according to the apparatus and method of this invention, the particular shape of the wraps 62 is used to facilitate fabrication of well screens having openings of different sizes.

Figure 5:
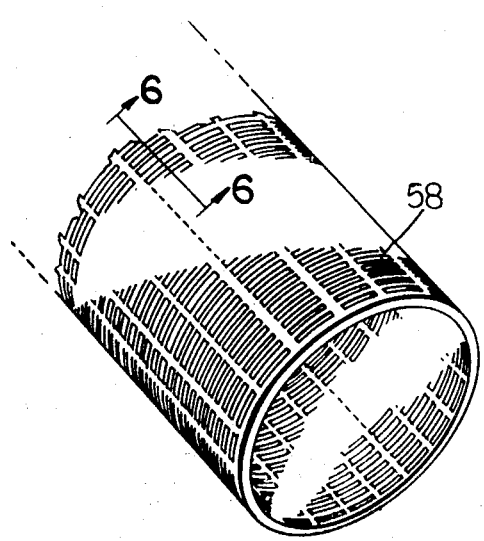
FIG. 5 is a perspective view of one end portion of the completed well screen of this invention.
Figure 7:
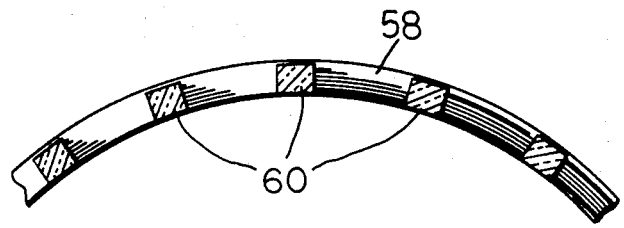
FIG. 7 is a fragmentary cross-sectional view of the well screen of FIG. 5.
Figure 6:
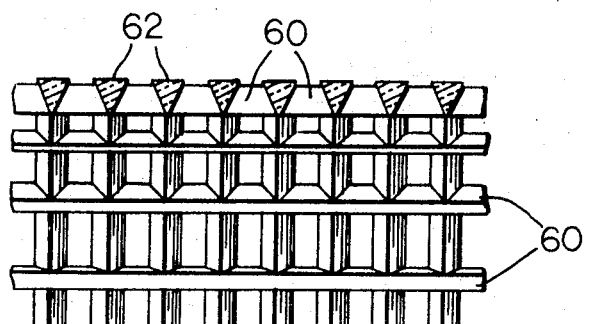
FIG. 6 is a fragmentary, longitudinal section of the well screen taken substantially along section line 6—6 of FIG. 5.
Figure 8:
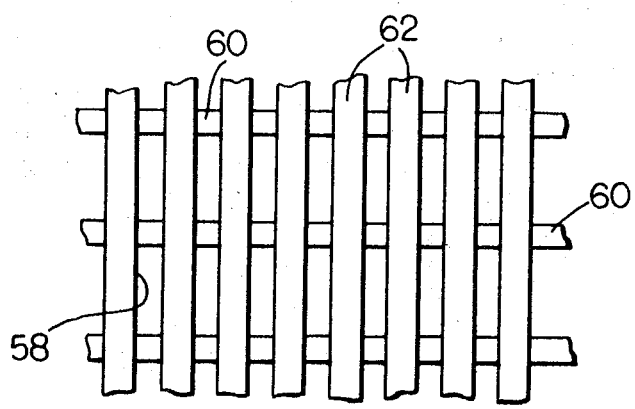
FIG. 8 is a fragmentary plan view, developed into a flat plane, of the well screen of FIG. 5.

Desirably, the outer surfaces of the circumferential wraps 62 extend radially outwardly beyond the bars 60 as shown in FIGS. 6, 7 and 8, but for particular purposes, these surfaces may be flush or coextensive as shown in FIG. 5. There are 120 grooves per foot.

In a typical embodiment of this invention, the mandrel 30 has an outer diameter of 3.813 inches, a length of 6 feet on which the helical groove 34 is provided, and is provided with 18 longitudinal grooves 36 around the circumference thereof. The helical groove 34 is 0.100 inch in depth and the grooves 36 are preferably square, having width and length dimensions of 0.070 × 0.070 inches. There are 120 turns, 34 per foot of mandrel length.

Figure 9:
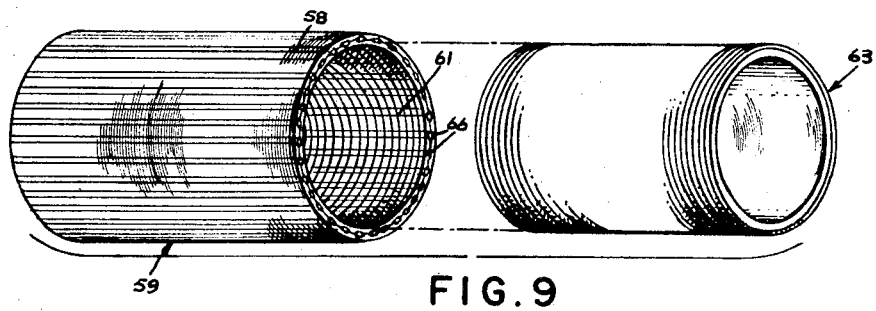
FIG. 9 is a perspective of a slightly different product fabricated according to the principles of this invention wherein the well screen is provided with an internal thread that can be screwed onto a conventional pipe nipple.

A slightly different embodiment of the method and apparatus as illustrated in FIGS. 9 through 13. In these figures, like numerals will indicate like parts. FIG. 9 illustrates another well screen embodiment having substantially the same structure as that shown in FIG. 5. The well screen in FIG. 9 is indicated by the numeral 59 and is provided with an internal screw thread 61 which may be used to screw the screen 59 onto a conventional externally threaded pipe nipple 63. Such a pipe nipple 63 is used to connect the well screen 59 to the usual well pipe or casing.

Figure 4:
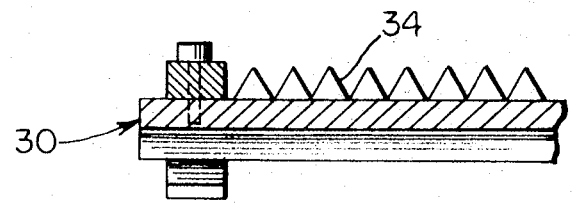
FIG. 4 is a fragmentary, longitudinal sectional view taken substantially along section line 4—4 of FIG. 2.
Figure 10:
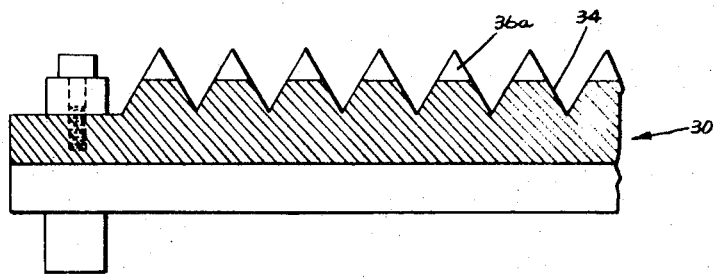
FIG. 10 is a fragmentary longitudinal section of a slightly different embodiment of the mandrel.
Figure 11:
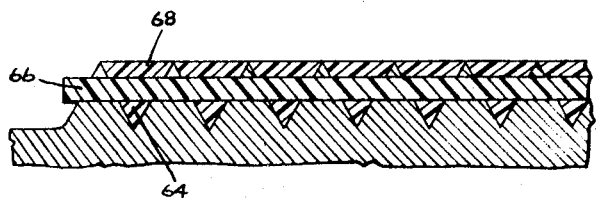
FIG. 11 is a section like FIG. 10 but with the fiber reinforced plastic assembled thereto.

This well screen 59 is fabricated by using the apparatus shown in FIGS. 10 and 11 which is identical to the apparatus previously described and identified by the same reference numerals. The mandrel 30 is composed of the same segments 38 as shown in FIGS. 3 and 4 with the exception that the grooves 36 (FIG. 2) are not made to the same depth as the helical groove 34, but only about a half or a third as deep, as indicated by the numeral 36a.

In a slightly different method, the bundle 28 is first laid or wound into the radially inner portion of the groove 34 for the entire length thereof and to a depth substantially flush with the longitudinal grooves 36a. Lengths of the bundle 28 are laid into the various grooves 36a, and are tensioned and tied therein as previously explained. These bundles may be wet with uncured resin. Thereafter, the bundle 28 is wound into the remainder of the groove 34 until it completely fills the same substantially as shown in FIG. 11. Thus, the bundles in the longitudinal grooves 36a are sandwiched between two separate windings of the bundle 28 in the helical groove 34, the initial winding being indicated by the numeral 64, the longitudinal bundles by the numeral 66, and the second and outer winding by the numeral 68.

Alternative to the bundles 66 being wet and then cured when installed in the grooves 36a, they may be precured in straight and tensioned condition to the precise shape of the grooves 36a which is essentially square or rectangular. The process of winding the portions 64 and 68 into the groove 34 is the same. The longitudinal bundle 66 corresponds to the rods 60 in FIGS. 6, 7 and 8.

Figure 12:
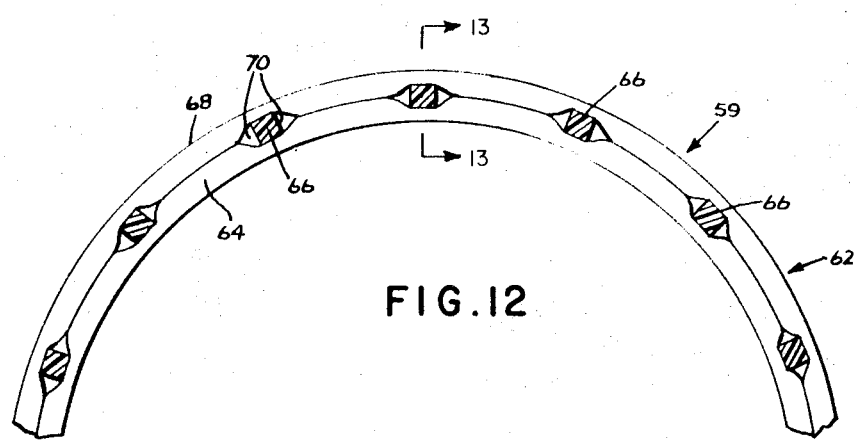
FIG. 12 is a fragmentary cross-section of a well screen made by means of the apparatus of FIGS. 10 and 11, this well screen being internally threaded.
Figure 13:
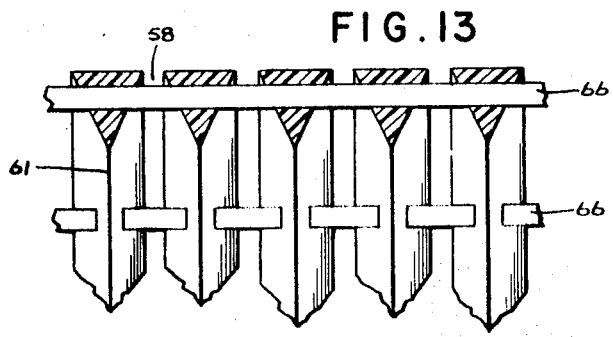
FIG. 13 is a fragmentary longitudinal section of the well screen of FIG. 10 taken substantially along the section line 13—13 of FIG. 12.

When the resin mass is cured and the mandrel stripped therefrom, the well screen will have the appearance in cross-section as shown in FIGS. 12 and 13, in FIG. 12 there being a slight longitudinal void 70 on each side of the bundle 66 when the latter is precured before the winding operation. In the instance in which the bundle 66 is not precured, it will be slightly flattened so as to either eliminate entirely or reduce the voids 70 to small size. The bundles 66 as shown in the drawings are precured.

As clearly shown in FIGS. 12 and 13, the bundles 66 which may be regarded as stiffening rods are disposed radially between the inner and outer peripheries of the helix coils. Thus the inner peripheral portion of the helix as indicated by the numeral 61 becomes a screw thread which may be screwed onto an externally threaded nipple 63 as shown in FIG. 9. Thus, this screen of FIGS. 12 and 13 not only has the characteristics previously described, but additionally it is internally threaded so as to be easily coupled to another threaded member.

All of the other processing steps, such as external grinding to determine the size of the openings 58, are the same for this embodiment of FIGS. 12 and 13 as the preceding embodiment. The windings or coils 62 are spaced apart in the finished product to determine the size of the openings 58.

Well screens made according to this invention are not subject to the deteriorating processes of electrolysis and corrosion problems which normally plague metallic screens. By reason of the glass fiber construction, the finished screen is capable of some torsional and longitudinal flexure such that the shapes of the various apertures 58 can be altered slightly. In well pumping operations, the movement of the water through the screen openings can cause slight flexing of the screen such that any tendency of particles to clog the openings will be minimized, because as the screen parts move slightly relative to each other, the particles tend to be dislodged.

While there have been described above the principles of this invention in connection with specific apparatus, it is to be clearly understood that this description is made only by way of example and not as a limitation to the scope of the invention.

What is claimed is:

1. A well screen in the form of a self-supporting element of cylindrical shape having a plurality of openings therein, said element including hardened plastic reinforced by class filaments, said filaments being contained in two groups, one group extending circumferentially of said element thereby imparting torsional strength thereto, the second group extending longitudinally of said element thereby imparting flexural strength thereto, said openings having opposed walls which diverge from each other in a direction radially inwardly of said elements, said openings being defined by first and second intersecting sets of plastic impregnated bundles of glass-filaments, the first set including a plurality of axially spaced circumferential coils of said bundles, the second set including a plurality of circumferentially spaced longitudinally extending bundles which are disposed radially intermediate the inner and outer peripheries of said coils and are adhered thereto whereby the inner peripheral portions of said coils form an internal screw thread.

2. The well screen of claim 1 in which said coils are triangular in cross-section with the apices thereof being radially innermost, said openings being in the shape of circumferentially extending slots, the ends of the slots being defined by the bundles of said second set and the sides by the bundles of said first set.

3. A well screen in the form of a self-supporting element of cylindrical shape having a plurality of openings therein, said element including hardened plastic reinforced by glass filaments, said filaments being contained in two groups, one group extending circumferentially of said element thereby imparting torsional strength thereto, the second group extending longitudinally of said element thereby imparting flexural strength thereto, a portion of said plastic and filaments internally of said element being in the form of screw threads which may be threaded onto an externally threaded member, said one group being in the form of axially spaced coils and said second group in the form of circumferentially spaced elongated members, said openings being defined by the spaces between said coils and members, respectively.

4. The well screen of claim 3 in which said coils are arranged as a helix which defines said screw thread.

* * * * *